(12) United States Patent
Ding

(10) Patent No.: US 7,961,876 B2
(45) Date of Patent: Jun. 14, 2011

(54) METHOD TO PRODUCE NEW MULTIVARIATE PUBLIC KEY CRYPTOSYSTEMS

(76) Inventor: Jintai Ding, Cincinnati, OH (US)

(*) Notice: Subject to any disclaimer, the term of this patent is extended or adjusted under 35 U.S.C. 154(b) by 1335 days.

(21) Appl. No.: 11/323,597

(22) Filed: Dec. 30, 2005

(65) Prior Publication Data

US 2008/0013716 A1    Jan. 17, 2008

Related U.S. Application Data

(60) Provisional application No. 60/642,838, filed on Jan. 11, 2005.

(51) Int. Cl.
*H04K 1/00*       (2006.01)
*H04L 9/00*       (2006.01)
*H04L 9/30*       (2006.01)

(52) U.S. Cl. ............ 380/30; 380/28; 380/255; 713/168; 713/180

(58) Field of Classification Search .................... 380/30, 380/28, 255
See application file for complete search history.

(56) References Cited

U.S. PATENT DOCUMENTS

| | | | |
|---|---|---|---|
| 4,405,829 A | 9/1983 | Rivest et al. | |
| 5,740,250 A | 4/1998 | Moh | |
| 5,790,675 A * | 8/1998 | Patarin | 713/180 |
| 7,100,051 B1 * | 8/2006 | Kipnis et al. | 713/180 |
| 2003/0215093 A1 * | 11/2003 | Ding | 380/255 |
| 2004/0151307 A1 * | 8/2004 | Wang et al. | 380/30 |

OTHER PUBLICATIONS

Felke, "On the Affine Transformations of HFE-Cryptosystems and Systems with Branches", Dec. 17, 2004, Department of Mathematics, Ruhr-University Bochum, D-44780 Bochum.*

* cited by examiner

*Primary Examiner* — Taghi T Arani
*Assistant Examiner* — Morshed Mehedi

(57) ABSTRACT

Multivariate public key cryptosystems (MPKC) are public key cryptosystems, whose public key are a set of multivariate polynomials over a finite field (or ring). MPKC can be used for encryption, authentication and signatures. The invention develops three new methods that could be applied to a multivariate public key cryptosystem to produce new multivariate public key cryptosystems that are better in terms of security and efficiency. These three methods are called the internal perturbation plus (IPP), the enhanced internal perturbation (EIP) and the multi-layer Oil-Vinegar construction (MOVC). These three methods can be combined in any 2 or all 3 to be applied to a multivariate public key cryptosystem to produce new multivariate public key cryptosystems as well.

9 Claims, No Drawings

METHOD TO PRODUCE NEW MULTIVARIATE PUBLIC KEY CRYPTOSYSTEMS

The present disclosure claims priority to U.S. provisional patent application Ser. No. 60/642,838, entitled Multivariable Public Key Systems, filed Jan. 11, 2005, which is incorporated herein by reference in its entirety and for all purposes.

BACKGROUND OF THE INVENTION

The invention relates to asymmetric cryptographic communication processes, in particular the multivariate public key cryptosystems (MPKC), to provide secure communication and secure authentication or signature.

The revolutionary idea of a public key cryptosystem, which has since fundamentally changed our modern communication system, was first suggested by Diffie and Hellman, though the first practical realization of this idea was the famous RSA cryptosystem by Rivest, Shamir and Adleman. (U.S. Pat. No. 4,405,829, 1983)

Multivariate public key cryptosystems are public key cryptosystems whose building blocks are multivariable polynomials, mostly, quadratic polynomials. This method relies on the proven theorem that solving a set of multivariable polynomial equations over a finite field, in general, is an NP-hard problem. This provides the possibility that they could resist even the future quantum computer attack while RSA can not [Sp], and due to the fast computation on small finite fields, they are much more efficient than RSA in general.

Early attempts like of Diffie and Fell [DF], and Shamir [Sh] failed.

A new design of multivariate cryptosystems was started by Matsumoto and Imai [MI] in 1988, which looked very promising but was defeated by Patarin in 1995 [P]. However many new systems are built inspired by this work.

1) Minus-Plus generalization. [CGP1] This is the simplest idea among all, namely one takes out (Minus method, which was first suggested in [Sh]) a few of the quadratic polynomial components of the cipher, and (or) adds (Plus method) a few randomly chosen quadratic polynomials. The main reason to take the "Minus" action is to improve the security [SH]. The Minus (only) method is very suitable for signature schemes, because it does not require that a documents to have a unique signature unlike the case of decryption process. Sflash [ACDG,CGP] is a Matsumoto-Imai-Minus cryptosystem. It was selected in 2004 by the NESSIE, the New European Schemes for Signatures, Integrity, and Encryption project within the Information Society Technologies (IST) Programme of the European Commission as one of the security standards for low-cost smart card applications after more than three years of screening process.

2) Hidden Field Equation Method. (HFE) [P1]. This method is suggested by Patarin to be the strongest. However a new algebraic attack using both the Minrank method and the relinearization method by Kipnis and Shamir [KS] shows that a special parameter can not be too small, but if this parameter is big, the system is just too slow. HFE is patented in Europe and US (U.S. Pat. No. 5,790,675, 1998). This is further confirmed in [FJ].

A new system proposed recently by Wang, Yang, Hu and Lai also is related to this family. [WYHL].

3) Vinegar-Oil method. The (balanced) Oil and Vinegar schemes and the unbalance Oil and Vinegar schemes [P3] [KPG] are new constructions of signature schemes. The balanced case was defeated by Kipnis and Shamir[Sh1]. The unbalanced case in general is not very efficient because the signature is more than twice the length of the document (or the hash of a document).

4) HFEV. The basic idea of this system is, on top of the HFE method, to add a few new external variables to make the system more complicated. This is a combination of HFE and Oil-Vinegar. Ding and Schmidt [DS3] recently observed that the attack in [KS] can also be applied to actually eliminate the small number of added variables and attack the system. A signature scheme Quartz was proposed as a HFE-Minus scheme and it has a very short signature of 128 bits [CGP2], but it is rather slow.

Another family is the triangular construction by T. T. Moh [M1] using special triangular type of invertible maps (Tame transformations). This method is named the tame transformation method (TTM). (U.S. Pat. No. 5,740,250, 1998) Courtois and Goubin [CM] used a method of minrank to attack this system. However the inventor of TTM refuted the claim in [CM], where they gave a new implementation schemes to support their claim. Later, Ding and Schmidt [DS1] [DS2] found out that actually all existing implementation schemes at the time have a common defect that could make them insecure. A new scheme is also proposed recently [MCY].

Attempts were made to use a similar but simpler idea for signature, which was called a TTS (tamed transformation signature) scheme. A few of them were suggested mainly by Chen and his collaborators [YC] [CYP]. A new construction of TTS [YCC] was proposed, but was defeated by Ding and Yin [DY]. Another new version is proposed in [YC1]. A similar construction was also proposed in [WHLCY] (US patent application: 20040151307, 2004).

The original ideal of internal perturbation was fist proposed by Ding. (US Patent application: 20030215093, 2003). This idea was applied to the Matsumoto-Imai system mentioned above in [D]. However this case was defeated by Pierre-Alain Fouque and Louis Granboulan and Jacques Stern [GGS]. As a further improvement, we proposed the Internal-Perturbation-Plus in this application. It is applied to the Matsumoto-Imai cryptosystem, which, we show, can effective resist all attacks [DG]. Another improvement is the enhanced internal perturbation, which is applied to HFE. [DS3].

The general multi-layer construction of ours was first applied to Oil-Vinegar case, which builds the rainbow system [DS4]. Both [YC1] and [WHLCY] are special examples of our general construction.

BRIEF SUMMARY OF THE INVENTION

This invention contains novel methods to improve any MPKC to produce new MPKC, which are more secure and efficient. These methods are called "internal perturbation plus" (IPP), "enhanced internal perturbation" (EIP) and "multi-layer Oil-Vinegar construction" (MOVC). These methods can also be combined to be applied to produce new MPKC. What makes these new methods particularly useful is that by applying them (individually or together) to any MPKC, we could 1. produce a new MPKC, which is more secure, and even makes a totally insecure MPKC secure; 2. the new MPKC is even more efficient, and enable them to maybe work even in small electronic devices such as smart-cards, RFID and others These new methods can be viewed as effective "repairing" and "enhancing" tools for MPKC. For example, for a cryptosystem invented in 1988 by MATSUMOTO and IMAI [MI], which was broken in 1995 by Jacques PATARIN [P], and therefore can not be used to practical applications, we could apply IPP to it to build a new MPKC, called perturbed Matsumoto-Imai-Plus cryptosystem (PMI+), which is secure and very efficient [DG].

In summary, the invention includes the following discoveries: 1. The inventor has shown three new methods that anyone can apply to existing MPKC to produce new MPKC that could be more efficient and more secure[DG][DS3][DS4]. 2. The inventor has shown that it is possible combine those methods in various way to build new method that can apply to existing MPKC to produce new MPKC that could be more efficient and more secure. 3. The inventor has shown that we could choose some of the polynomials in special ways that could make the MPKC even more efficient.

Though this invention has been described with specific embodiments thereof, it is clear that many variations, alternatives, modifications will become apparent to those who are skilled in the art of cryptography. Therefore, the preferred embodiments of the invention as set forth herein, are intended to be illustrative, not limiting. Various changes may be made without departing from the scope and spirit of the invention as set forth herein and defined in the claims.

DETAILED DESCRIPTION OF THE INVENTION

1. Internal Perturbation Plus (IPP) Method 1.1 The basic idea of IPP.

The name Internal perturbation plus is given to the first family of method of the invention to improve MPKC. The basic idea of IPP will now be presented. Then, in the subsequent subsection, certain particularly examples of the application of IPP, which is used on the Matsumoto-Imai cryptosystems to produced the so-called the internal perturbed Matsumoto-Imai-Plus cryptosystems (PMI+) will be shown.

The reason that the word "perturbation" is used here is that our method is very similar to a physical idea of perturbation, where one intentionally "changes" or adds "noise" to the system in a very small scale to see how a system will evolve and therefore to derive new information about the system itself. The key is that this has to be done in a controlled way such that the system itself is not fundamentally altered. Our method is indeed just to "add" random "small" noise" to the cryptosystem such that it becomes much harder to break. The method of perturbation is included in a US pending patent application by the inventor (20030215093 with filing date, November, 2003), see also [D]. The new IPP is a further improvement of the previous perturbation method so the system could resist the new differential attacks [FGS][DG].

Let's assume that we have a multivariate public key cryptosystem. This public key cryptosystem's public key consists of the field (or ring) structure of a finite field (or ring) (k) with (q) elements and a set of (m) polynomials over (k) $(f_1(x_1, \ldots, x_n), \ldots, f_m(x_1, \ldots, x_n))$ of a low degree (d) with (n) variables, which are publicly accessible to anyone. The public transformation or computation, which is used either as an process to encrypt a message or a process to verify the authenticity of either the signatures or the authentications, is to calculate $(f_1(x_1, \ldots, x_n), \ldots, f_m(x_1, \ldots, x_n)) = (y_1, \ldots, y_m) = Y$ for a given value (X) represented by a vector of (n) elements of a finite field, or ring (k), $X=(x_1, \ldots, x_n)$, and only for signatures or authentications, one also needs to check if this Y is indeed the same as the attached signature or authentication code, which is another vector (Y') of (m) elements of the finite field or ring (k) to either accept or deny the authenticity of the signature or the authentication.

The secret transformation or computation, which is a process one can find the (or a) value of (n) vectors $X=(x_1, \ldots, x_n)$ for any given value of a vector of (m) elements of the finite field or ring (k), $Y=(y_1, \ldots, y_m)$ such that $(f_1(x_1, \ldots, x_n), \ldots, f_m(x_1, \ldots, x_n)) = (y_1, \ldots, y_m)$, requires the knowledge of the secret key that $(f_1(x_1, \ldots, x_n), \ldots, f_m(x_1, \ldots, x_n))$ can be factorized as a composition of three transformations: $(f_1(x_1, \ldots, x_n), \ldots, f_m(x_1, \ldots, x_n)) = L_2 \circ \bar{F} \circ L_1(x_1, \ldots, x_n)$, where $\circ$ means the composition of the transformations, $L_1$, $L_2$, are invertible affine linear transformations over the space of vectors of (n) and (m) elements of (k) respectively, and $\bar{F}(x_1, \ldots, x_n) = (\bar{f}_1(x_1, \ldots, x_n), \ldots, \bar{f}_m(x_1, \ldots, x_n))$ is another polynomial transformation, which has a fast algorithm to calculate its inverse $\bar{F}^{-1}$ efficiently, or equivalently for any $Y=(y_1, \ldots, y_m)$, there is a fast algorithm to calculate efficiently the (or a) value of $X=(x_1, \ldots, x_n)$ which satisfies $\bar{F}(x_1, \ldots, x_n) = (y_1, \ldots, y_n)$. The secret key is only accessible to a legitimate user. The secret transformation or computation process is used either to decrypt a message or to produce a legitimate signature or authentication code that can be publicly verified.

This method of (IPP) can produce new multivariate public key cryptosystems for each pair of parameter r and $\alpha$. Here r and $\alpha$ are two positive integers.

One instance of the new multivariate public key cryptosystems for a fixed r and $\alpha$ is given as following.

This new multivariate public key cryptosystem has a new public key, the field (or ring) structure of (k), which the original MPKC have before, and a new set of public polynomials:

$(f_1^+(x_1, \ldots, x_n), \ldots, f^+_{m+\alpha}(x_1, \ldots, x_n))$ over (k) again of the same low degree (d). The public transformation or computation, which can be used for encryption or verification, becomes the process to compute the value of the set of the public polynomials $(f_1^+(x_1, \ldots, x_n), \ldots, f^+_{m+\alpha}(x_i, \ldots, x_n)) = (y_1, \ldots, y_{m+\alpha})$.

Now the new secret computation requires the new secret key that $(f_1^+(x_1, \ldots, x_n), \ldots, f^+_{m+\alpha}(x_1, \ldots, x_n)) = \tilde{L}_2 \circ \tilde{F} \circ L_1 (x_1, \ldots, x_n)$, where $\tilde{L}_2$ is a randomly or specially chosen invertible affine linear transformations over the space of vectors of $(m+\alpha)$ elements of (k) and $L_1$ is a randomly or specially chosen invertible affine linear transformations over the space of vectors of (n) elements of (k), $\tilde{F}(x_1, \ldots, x_n) = (\bar{f}_1(x_1, \ldots, x_n) + g_1(z_1, \ldots, z_r), \ldots, \bar{f}_m(x_1, \ldots, x_n) + g_n(z_1, \ldots, z_r), p_1(x_1, \ldots, x_n), \ldots, p_\alpha(x_1, \ldots, x_n))$, $$z_i = \sum_{j=1}^{n} a_{ij} x_j + b_i,$$

$i=1, \ldots, r$, are randomly or specially chosen and the linear part of $z_1, \ldots, z_r$ are linearly independent as linear functions of $x_i$, $g_i(z_1, \ldots, z_r)$, $i=1, \ldots,$ n are randomly or specially chosen polynomials of degree less or equal to (d) with the r variables $z_1, \ldots, z_r$, $p_i(x_1, \ldots, x_n)$, $i=1, \ldots, \alpha$, are also randomly or specially chosen polynomials of degree less or equal to (d) with the n variables $x_1, \ldots, x_n$.

The new secret transformation or computation, which is used either for decryption, or for production of a legitimate signature or authentication code becomes the process to find the (or a) value $X=(x_1, \ldots, x_n)$ for any given $Y^+=(y_1, \ldots, x_{m+\alpha})$ such that $(f_1^+(x_1, \ldots, x_n), \ldots, f^+_{m+\alpha}(x_1, \ldots, x_n)) = Y^+ = (y_1, \ldots, y_{m+\alpha})$.

This is performed by the following steps by the legitimate user.

The legitimate user first compute $\tilde{L}_2^{-1}(Y^+)$, which produces an intermediate value $Y'^+ = (y'_1, \ldots, y'_{m+\alpha})$. Then chooses all possible values for $z_i$, $i=1, \ldots, r$ one by one (all total $q^r$) and calculate $\bar{F}^{-1}(y'_1-g_1(z_1, \ldots, z_r), y'_m-g_m(z_1,\ldots,z_r))=(x''_1,\ldots,x''_n)=X''^+$ by using the algorithm from the original cryptosystem.

For each $X''^+$, the legitimate user computes the value of $((p_1(x''_1, \ldots, x''_n), \ldots, p_\alpha(x''_1, \ldots, x''_n))$, and check if $((p_1(x''_1,\ldots,x''_n),\ldots,p_\alpha(x''_1,\ldots,x''_n))=(y'_{m+1},\ldots,y_{m+\alpha})$, discard the $X''^+$, if the answer is negative, and keep it if positive.

The legitimate user calculates $L_1^{-1}(x''_1, \ldots, x''_n))$ for the $(x''_1, \ldots, x''_n)$ that survives the step above. This produces a value for $(x_1, \ldots, x_n)$, which can be the decrypted message or a legitimate signature or a legitimate authentication code.

Here the polynomials $g_i(z_1, \ldots, z_r)$, $i=1, \ldots, n$, can be viewed as "noise" added to the systems. The polynomials $p_i(x_1, \ldots, x_n)$, $i=1, \ldots, \alpha$, can be viewed as PLUS polynomials, which comes from a known method developed by Patarin and etc [CGP1].

1.2 An example of the perturbed Matsumoto-Imai-Plus cryptosystem, the application of IPP to the Matsumoto-Imai cryptosystem.

This is based on the work of the inventor [DG].

1.2.1 First we present the Matsumoto-Imai MPKC [MI]. Here, we assume that (k) is a finite field, (q), the number of elements in (k), is $2^h$ and mathematically we say that (k) is of characteristic 2. We fix an irreducible polynomial of $g(x)$ in the ring of polynomials over k, k[x], which is of degree n. Then we can obtain a larger field K, which is a degree n extension of (k), $K=k[x]/g(x)$. In K, each elements is uniquely represented by a polynomial whose degree is less than n. There is a bijective transformation $\Phi$, which transforms an element in K into an element of $k^n$, the space of the vectors of (n) elements of (k), which is defined by $\Phi(a_0+a_1 x + \ldots + a_{n-1} x^{n-1})=(a_0, a_1, \ldots, a_{n-1})$.

Find an positive integer $\theta$ between 0 and n such that GCD $(q^\theta+1, q^n-1)=1$, and define a new transformation $\tilde{F}$ over K: $\tilde{F}(X)=X^{q^\theta+1}$.

$\tilde{F}$ is and invertible and $\tilde{F}^{-1}(X)=X^t$ where $t(q^\theta+1)=1$ modular $q^n-1$. Let the transformation $\bar{F}(x_1,\ldots,x_n)$ from $k^n$ to $k^n$ be defined as $\bar{F}(x_1, \ldots, x_n)=(\bar{f}_1(x_1, \ldots, x_n), \ldots, \bar{f}_n(x_1, \ldots, x_n))=\Phi\circ\tilde{F}\circ\Phi^{-1}(x_1, \ldots, x_n)$ and here the $\bar{f}_i(x_1, \ldots, x_n)$, $i=1, \ldots, n$, are quadratic (low degree(d=2)) polynomials in the variables $x_1, \ldots, x_n$. Let $L_1$, $L_2$ be two randomly chosen invertible affine linear maps over $k^n$ and define $F(x_1, \ldots, x_n)=(f_1(x_1, \ldots, x_n), \ldots, f_n(x_1, \ldots, x_n))=L_1\circ\bar{F}\circ L_2 (x_1, \ldots, x_n)$.

Here each of the polynomials is of degree 2. (d=2)

The Matsumoto-Imai cryptosystem for encryption is given as follows. Assume that Bob wants to set up a Matsumoto-Imai MPKC for himself. Then he would have the public key, which is made accessible publicly, including 1) the field (k) including its addition and multiplication structure; 2) the n quadratic polynomials $f_1(x_1, \ldots, x_n), \ldots, f_n(x_1, \ldots, x_n)$. If anyone, say Alice wants to send a secret message to Bob, she will first encrypt a message given as a vector $X=(x_1, \ldots, x_n)$, by first obtaining the public key and then calculating the value $(f_1(x_1, \ldots, x_n), \ldots, f_n(x_1, \ldots, x_n))=((y_1, \ldots, y_n)$ and $(y_1, \ldots, y_n)$ is the encrypted message.

The cryptographic secret, the private key, includes the two affine linear maps $L_1, L_2$, which Bob keeps secret.

The parameter $\theta$ can be either as part of public key or the secret key, because it is not so hard to guess it (only n choices as n is never too large).

Now if Bob receives the message from Alice, with the secret key, he needs to go through the decryption process, which consists of the following steps. I) compute $(\bar{y}_1, \ldots, \bar{y}_n)=L_1^{-1}(y_1, \ldots, y_n)$; II) compute $(y_{\lambda_1}, \ldots, y_{\lambda_n})=\bar{F}^{-1}(\bar{y}_1, \ldots, \bar{y}_n)=\Phi\circ\tilde{F}^{-1}\circ\Phi^{-1}(\bar{y}_1, \ldots, \bar{y}_n)$; III) compute $L_2^{-1}(y_{\lambda_1}, \ldots, y_{\lambda_n})=(x_1, \ldots, x_n)$, which gives the secret message.

This MPKC was broken by Patarin using the linearization equations [P], therefore this cryptosystem is of no practical value.

1.2.2 Now we will use the IPP method to produce new secure cryptosystems[DG]. One instance of the new multivariate public key cryptosystems for a fixed r and $\alpha$ is given as following.

Fix a small integer r and we randomly or specially choose r affine linear functions $z_1, \ldots, z_r$, written $$z_i = \sum_{j=1}^n a_{ij} x_j + b_i,$$

for $i=1, \ldots, r$. The linear part of $z_1, \ldots, z_r$, are linearly independent as linear functions of $x_i$, This defines a map $Z$ $k^n \to k^r$: $Z(x_1, \ldots, x_n)=(z_1, \ldots z_r)$. Now randomly or specially choose n quadratic polynomials of degree less or equal to (d) with the r variables $z_1, \ldots, z_r$, $g_i(z_1, \ldots, z_r)$, $i=1, \ldots, n$; and randomly or specially choose $\alpha$ polynomials of degree less or equal to (d) with the n variables $x_1, \ldots, x_n$. $p_i(x_1, \ldots, x_n)$, $i=1, \ldots, \alpha$.

The new multivariate public key cryptosystem, which we call the perturbed Matsumoto-Imai-Plus (PMI+) has a new public key, which includes the field (or ring) structure of (k), what the original Matsumoto-Imai MPKC has before, and a new set of public polynomials: $(f_1^+(x_1, \ldots, x_n), \ldots, f^+_{m+\alpha}(x_1, \ldots, x_n))$ over (k) again of the same low degree (d=2). The public computation, which can be used for encryption or verification, becomes the process to compute the value of the set of the public polynomials Now the new secret computation requires the new secret key that $(f_1^+(x_1, \ldots, x_n), \ldots, f^+_{m+\alpha}(x_1, \ldots, x_n))=\tilde{L}_2\circ\tilde{F}\circ L_1 (x_1, \ldots, x_n)$, where $\tilde{L}_2$ is a randomly or specially chosen invertible affine linear transformation over the space of vectors of (m+$\alpha$) elements of (k) and $L_1$ is again a randomly or specially chosen invertible affine linear transformation over the space of vectors of (n) elements of (k), $\tilde{F}(x_1, \ldots, x_n)=(\bar{f}_1(x_1, \ldots, x_n)+g_1(z_1, \ldots, z_r), \ldots, \bar{f}_m(x_1, \ldots, x_n)+g_n(z_1, \ldots, z_r), p_1(x_1, \ldots, x_n), \ldots, p_\alpha(x_1, \ldots, x_n))$.

The PMI+ cryptosystem for encryption is given as follows. The public key, which is accessible publicly, includes 1) the field (k) including its addition and multiplication structure; 2) the n+$\alpha$ quadratic polynomials $(f_1^+(x_1, \ldots, x_n), \ldots, f^+_{m+\alpha}(x_1, \ldots, x_n))$.

To encrypt a message given as a vector $X=(x_1, \ldots, x_n)$, one first obtains the public key, calculates the value $(f_1^+(x_1, \ldots, x_n), \ldots, f^+_{m+\alpha}(x_1, \ldots, x_n))=(y_1, \ldots, y_{m+\alpha})$, and $(y_1, \ldots, y_{m+\alpha})$ is the encrypted message. This is the part of public computation.

The secret key, which is only accessible to the legitimate user includes: 1) $\tilde{L}_2$ and $L_1$; 2) the linear functions $$z_i = \sum_{j=1}^n a_{ij} x_j + b_i,$$

for $i=1, \ldots, r$; 3) the quadratic functions $g_i(z_1, \ldots, z_r)$, $i=1, \ldots, n$; 4) the quadratic functions $p_i(x_1, \ldots, x_n)$, $i=1, \ldots, \alpha$.

To decrypt the message, which the new secret computation, becomes the process to find the value $X=(x_1, \ldots, x_n)$ for any given $Y^+=(y_1, \ldots, y_{m+\alpha})$ such that $(f_1^+(x_1, \ldots, x_n), \ldots, f^+_{m+\alpha}(x_1, \ldots, x_n))=Y^+=(y_1, \ldots, y_{m+\alpha})$. This is performed by the following steps by the legitimate user. 1) The legitimate user first computes $\tilde{L}_2^{-1}(Y^+)$, which produces an intermediate value $Y'^+=(y'_1, \ldots, y'_{m+\alpha})$. 2) Chooses all possible values for $z_i$, $i=1, \ldots, r$ one by one (all total $q^r$) and calculate $\tilde{F}^{-1}(y'_1-g_1(z_1, \ldots, z_r), y'_m-g_m(z_1, \ldots, z_r))=\Phi \circ F^{-1} \circ \Phi^{-1}(y'_1-g_1(z_1, \ldots, z_r), \ldots, y'_m-g_m(z_1, \ldots, z_r))=(x''_1, \ldots, x''_n)=X''^+$ by using the algorithm from the original Matsumoto-Imai cryptosystem. 3) For each $X''^+$, the legitimate user computes the value of $((p_1(x''_1, \ldots, x''_n), \ldots, p_\alpha(x''_1, \ldots, x''_n))$, and checks if $((p_1(x''_1, \ldots, x''_n), \ldots, p_\alpha(x''_1, \ldots, x''_n))=(y'_{m+1}, \ldots, y'_{m+\alpha})$, discards the $X''^+$, if the answer is negative, and keeps it if positive. 4) The legitimate user calculates $L_1^{-1}(x''_1, \ldots, x''_n)$ for the $(x''_1, \ldots, x''_n)$ that survives the step above. This produces a value for $(x_1, \ldots, x_n)$, which is the decrypted message. One must be very careful here about the choice of r and $\alpha$. One should make sure that both these two parameters are sufficient large that they can resist the recently developed differential attacks.

Here we require that both r and $\alpha$ can not be too large. When $\alpha$ is too large, the system becomes insecure, in particular due to the Gröbner basis type of attacks like XL and the $F_4$, $F_5$ algorithms. When r is too large, the system becomes too inefficient.

2. Enhanced Internal Perturbation (EIP) Method 2.1 The Basic Idea of EIP

We will present the second method, which is called an enhanced internal perturbation (EIP). We will first present the basic idea and an example of the application of EIP will also presented, which is used on the HFE cryptosystems to produce the so-called the internal perturbed HFE cryptosystems (IPHFE)[DS3].

Again this belongs to the same idea of using perturbations. However the difference is the first method can be viewed as a direct perturbation, where one just adds noise by adding new polynomials into the system, the enhanced perturbation goes one step further, where one does not only add polynomial but also mixing the "noise" polynomials into the systems.

Assume that we have a multivariate public key cryptosystem, a cryptographic communication process.

This public key cryptosystem's public key consists of the field (or ring) structure of a finite field (or ring) (k) with (q) elements and a set of (m) polynomials over (k) $(f_1(x_1, \ldots, x_n), \ldots, f_m(x_1, \ldots, x_n))$ of a low degree (d) with (n) variables, which are publicly accessible to anyone.

The public transformation or computation, which is used either as an process to encrypt a message or a process to verify the authenticity of either the signatures or the authentications, is to calculate $(f_1(x_1, \ldots, x_n), \ldots, f_m(x_1, \ldots, x_n))=(y_1, \ldots, y_m)=Y$ for a given value (X) represented by a vector of (n) elements of a finite field, , or ring (k), $X=(x_1, \ldots, x_n)$, and only for signatures or authentications, one also needs to check if this Y is indeed the same as the attached signature or authentication code, which is another vector (Y') of (m) elements of the finite field or ring (k) to either accept or deny the authenticity of the signature or the authentication.

The secret transformation or computation, which is a process one can find the (or a) value of (n) vectors $X=(x_1, \ldots, x_n)$ for any given value of a vector of (m) elements of the finite field or ring (k), $Y=(y_1, \ldots, y_m)$ such that $(f_1(x_1, \ldots, x_n), \ldots, f_m(x_1, \ldots, x_n))=(y_1, \ldots, y_m)$, requires the knowledge of the secret key that that $(f_1(x_1, \ldots, x_n), \ldots, f_m(x_1, \ldots, x_n))$ can be factorized as a composition of three transformations:

$(f_1(x_1, \ldots, x_n), \ldots, f_m(x_1, \ldots, x_n))=L_2 \circ \bar{F} \circ L_1(x_1, \ldots, x_n)$, where $\circ$ means the composition of the transformations, $L_1$, $L_2$, are invertible affine linear transformations over the space of vectors of (n) and (m) elements of (k) respectively, and $\bar{F}(x_1, \ldots, x_n)=(\bar{f}_1(x_1, \ldots, x_n), \ldots, \bar{f}_m(x_1, \ldots, x_n))$ is another polynomial transformation, which has a fast algorithm to calculate its inverse $\bar{F}^{-1}$ efficiently, or equivalently for any $Y=(y_1, \ldots, y_m)$, there is a fast algorithm to calculate efficiently the (or a) value of $X=(x_1, \ldots, x_n)$ which satisfies $\bar{F}(x_1, \ldots, x_n)=(y_1, \ldots, y_m)$. The secret key is only accessible to legitimate user. The secret computation process is used either to decrypt a message or to produce a legitimate signature or authentication code that can be publicly verified.

The second method of EIP produces new multivariate public key cryptosystems. For one instance of this new asymmetric cryptographic communication process, it has a new set of public polynomials becomes $(f_1^e(x_1, \ldots, x_n), \ldots, f^e_m(x_1, \ldots, x_n))$, which has a new cryptographic secret that $(f_1^e(x_1, \ldots, x_n), \ldots, f^e_m(x_1, \ldots, x_n))=L_2 \circ \hat{F} \circ L_1(x_1, \ldots, x_n)$, where $\hat{F}(x_1, \ldots, x_n)$ is derived from $\bar{F}(x_1, \ldots, x_n)$ by not only adding randomly or specially chosen polynomials of $z_1, \ldots, z_r$ of degree less or equal to (d) but also mixing lower degree polynomials of $z_1, \ldots, z_r$ with terms of lower degree of $\bar{F}(x_1, \ldots, x_n)$ by multiplying them together. For the case if d=2, where the polynomials are quadratic, it is given as:

$$\hat{F}(x_1, \ldots, x_n) = $$
$$\left( \bar{f}_1^2(x_1, \ldots, x_n) + \sum_{i=1}^{n} a_{1i} q_{1i}(z_1, \ldots, z_r) x_i + g_1(z_1, \ldots, z_r), \ldots, \right.$$
$$\left. \bar{f}_m^2(x_1, \ldots, x_n) + \sum_{i=1}^{n} a_{mi} q_{mi}(z_1, \ldots, z_r)_i(z_i, \ldots, z_r) \right),$$
$$, z_i = \sum_{j=1}^{n} e_{ij} x_j + b_i,$$

$i=1, \ldots, r$ are randomly or specially chosen and are linearly independent as linear functions of $x_i$, $g_i(z_1, \ldots, z_r)$, $i=1, \ldots, n$, are randomly or specially chosen polynomials of degree less or equal to (d) with r variables $z_1, \ldots, z_r$, and $q_{ij}(z_1, \ldots, z_r)$, $i=1, \ldots m; j=1, \ldots, n$, are randomly or specially chosen polynomials of degree less or equal to (d−1) with r variables $z_1, \ldots, z_r$, $a_{ij}$ are randomly or specially chosen, $$\bar{f}_l(x_1, \ldots, x_n) = \bar{f}_l^2(x_1, \ldots, x_n) + \sum_{i=1}^{n} \alpha_{li} x_i 1 = 1, \ldots, m,$$

and $\bar{f}_1^2(x_1, \ldots, x_n)$ consists of only the degree 2 part and the constant part of $\bar{f}_1(x_1, \ldots, x_n)$;

The new MPKC has a new cryptographic communication process with a new public transformation, a process to transform a value (X) represented by (n) elements of a finite field, , or ring (k), $X=(x_1, \ldots, x_n)$, into another value (Y) represented by (m) elements of the finite field or ring (k) by the new set of (m) multivariate polynomials $(f_1^e(x_1, \ldots, x_n), \ldots, f^e_m(x_1, \ldots, x_n))$ over (k);

The new MPKC has a new cryptographic communication process with a new secret transformation, a process to obtain the value (or a ) (X) from the value (Y) by means of inverting the transformation defined by $(f_1^e(x_1, \ldots, x_n), \ldots, f_m^e(x_1, \ldots, x_n))$, with the knowledge of the cryptographic secret: $(f_1^e(x_1, \ldots, x_n), \ldots, f_m^e(x_1, \ldots, x_n)) = L_2 \circ \bar{F} \circ L_1(x_1, \ldots, x_n)$.

This is performed by the following steps by the legitimate user with the knowledge of the secret key, or the cryptographic secret.

1) The legitimate user applies $L_2^{-1}$ to (Y) to produce an intermediate value $Y' = (y'_1, \ldots, y'_m)$, 2) Then choose all possible values for $z_i$, $i = 1, \ldots, r$ one by one (all total $q^r$) and calculating
$\bar{F}_{(z_1, \ldots, z_r)}^{-1}(y'_1 - g_1(z_1, \ldots, z_r), \ldots, y'_m - g_m(z_1, \ldots, z_r)) = (x''_1, \ldots, x''_n) = X''^+,$ $$\bar{F}_{(z_1, \ldots, z_r)}(x_1, \ldots, x_n) = (\bar{f}_1^2(x_1, \ldots, x_n) + \sum_{i=1}^n a_{1i} q_{1i}(z_1, \ldots, z_r) x_i, \ldots ,$$

where $$\bar{f}_m^2(x_1, \ldots, x_n) + \sum_{i=1}^n a_{mi} q_{mi}(z_1, \ldots, z_r) x_i),$$

and we also require that the inverse of $\bar{F}_{(z_1, \ldots, z_r)}(x_1, \ldots, x_n)$ can be calculated easily just like the inverse of $\bar{F}(x_1, \ldots, x_n)$, 3) The last step is to calculate $L_1^{-1}(x''_1, \ldots, x''_n)$, which produces a value for $(x_1, \ldots, x_n)$.

2.2 An example of the internal perturbed HFE cryptosystem (IPHFE), the application of EIP to the HFE cryptosystem.

HFE cryptosystem is a patented MPKC developed by Patarin. The patent was filed in 1995 in France and 1996 in US (U.S. Pat. No. 5,790,675).

HFE [P1] cryptosystems depend on a special parameter D. However recent works by Kipnis, Shamir, Courtois, Faugere [C][KS][FJ] show that this D cannot be too small. However as D increases the efficiency the system becomes very slow. The IPHFE, an example of application of EIP to HFE, can produces new cryptosystems that are much more efficient. [DS3]

2.2.1 The HFE cryptosystem.

Hidden Field Equation cryptosystem is also developed by Patarin [P1], who believed that this construction is the strongest. This cryptosystem is very similar to the Matsumoto-Imai cryptosystems.

Here, we assume that (k) is a finite field, (q) is the number of elements in (k), and mathematically (k) is not necessarily of characteristic 2. We fix an irreducible polynomial of $g(x)$ in the ring of polynomials over k, k[x], which is of degree n. Then we can obtain a larger field K, which is a degree n extension of (k), $K = k[x]/g(x)$. In K, each element is uniquely represented by a polynomial whose degree is less than n.

There is a bijective transformation $\Phi$, which transforms an element in K into an element of $k^n$, the space of the vectors of (n) elements of (k), which is defined by $\Phi(a_0 + a_1 x + \ldots + a_{n-1} x^{n-1}) = (a_0, a_1, \ldots, a_{n-1})$. We define a function $\tilde{F}$ over K as:

$$\tilde{F}(X) = \sum_{\substack{0 \le i \le j \\ q^i + q^j \le D}} A_{ij} X^{q^i + q^j} + \sum_{q^j \le D} B_j X^{q^j} + C$$

where the polynomial coefficients are randomly chosen, the total degree of D can not be too large.

Though, in general, $\tilde{F}$ is not bijective anymore, but we can find the inverse of $\tilde{F}$, namely we can solve the polynomial equation $\tilde{F}(X) = Y'$ for a constant Y', by using the Berlekamp's algorithm. Due to the Berlekamp's algorithm's computation complexity, the degree (D) here can not be too big, otherwise, it will become impossible to calculate $\tilde{F}^{-1}$.

Let the transformation $\bar{F}(x_1, \ldots, x_n)$ from $k^n$ to $k^n$ be defined as $\bar{F}(x_1, \ldots, x_n) = (\bar{f}_1(x_1, \ldots, x_n), \ldots, \bar{f}_n(x_1, \ldots, x_n)) = \Phi \circ \tilde{F} \circ \Phi^{-1}(x_1, \ldots, x_n)$ and here the $\bar{f}_i(x_1, \ldots, x_n)$, $i = 1, \ldots, n$, are quadratic (low degree(d=2)) polynomials in the variables $x_1, \ldots, x_n$. Let $L_1, L_2$ be two randomly chosen invertible affine linear maps over $k^n$ and define
$F(x_1, \ldots, x_n) = (f_1(x_1, \ldots, x_n), \ldots, f_n(x_1, \ldots, x_n)) = L_1 \circ \bar{F} \circ L_2(x_1, \ldots, x_n).$ The HFE cryptosystem for encryption is given as follows. The public key, which is accessible publicly, includes 1) the field (k) including its addition and multiplication structure; 2) the n quadratic polynomials $f_1(x_1, \ldots, x_n), \ldots, f_n(x_1, \ldots, x_n)$.

To encrypt a message given as a vector $X = (x_1, \ldots, x_n)$, one first obtains the public key, calculates the value $(f_1(x_1, \ldots, x_n), \ldots, f_n(x_1, \ldots, x_n)) = (y_1, \ldots, y_n)$ and $(y_1, \ldots, y_n)$ is the encrypted message.

The cryptographic secret, the private key, includes the two affine linear maps $L_1, L_2$, the function $\tilde{F}$ and the big field K.

The decryption process consists of the following steps. Once the legitimate user has the encrypted message the decryption process includes the following steps: I) compute ($\bar{y}_1, \ldots, \bar{y}_n) = L_1^{-1}(y_1, \ldots, y_n)$; II) compute $(y_{\lambda_1}, \ldots, y_{\lambda_n}) = \tilde{F}^{-1}(\bar{y}_1, \ldots, \bar{y}_n) = \Phi \circ \tilde{F}^{-1} \circ \Phi^{-1}(\bar{y}_1, \ldots, \bar{y}_n)$ by using the Berlekamp's algorithm. III) compute $L_2^{-1}(y_{\lambda_1}, \ldots, y_{\lambda_n}) = (x_1, \ldots, x_n)$, which gives the secret message.

Note that in II), one might get multiple solutions, this can be handled easily by either applying the PLUS method, namely adding more randomly chosen polynomials to mix into the system, which can be used to differentiate who is the real solution, or using other technique such as hash functions.

2.2.2 The new IPHFE cryptosystems.

We now apply EIP to HFE to produce a family of new public key cryptosystems, which depend on a parameter r, a small positive integer [DS3].

For one instance of this new asymmetric cryptographic communication process, where we have a fixed r, the new public polynomials becomes $(f_1^e(x_1, \ldots, x_n), \ldots, f_n^e(x_1, \ldots, x_n))$, which has a new cryptographic secret that $(f_1^e(x_1, \ldots, x_n), \ldots, f_n^e(x_1, \ldots, x_n)) = L_2 \circ \hat{F} \circ L_1(x_1, \ldots, x_n)$, where $\hat{F}(x_1, \ldots, x_n)$ is derived from $\bar{F}(x_1, \ldots, x_n)$ by not only adding randomly polynomials of $z_1, \ldots, z_r$ of degree less or equal to (d) but also mixing lower degree polynomials of $z_1, \ldots, z_r$ with terms of lower degree of $\bar{F}(x_1, \ldots, x_n)$ by multiplying them together such that $$\hat{F}(x_1, \ldots, x_n) =$$
$$\left( \bar{f}_1^2(x_1, \ldots, x_n) + \sum_{i=1}^n a_{1i} q_{1i}(z_1, \ldots, z_r) x_i + g_1(z_1, \ldots, z_r), \ldots , \right.$$
$$\left. \bar{f}_n^2(x_1, \ldots, x_n) + \sum_{i=1}^n a_{ni} q_{ni}(z_1, \ldots, z_r) x_i + g_n(z_1, \ldots, z_r) \right),$$

$$z_i = \sum_{j=1}^n e_{ij} x_j + b_i,$$

i=1, ..., r are randomly or specially chosen and are linearly independent as linear functions of $x_i$, $g_i(z_1, \ldots, z_r)$, i=1, ..., n, are randomly or specially chosen polynomials of degree less or equal to (d) with r variables $z_1, \ldots, z_r$, and $q_{ij}$ ($z_1, \ldots, z_r$), i=1, ..., n; j=1, ..., n, are randomly or specially chosen polynomials of degree less or equal to (d−1) with r variables $z_1, \ldots, z_r$, $$\bar{f}_l(x_1, \ldots, x_n) = \bar{f}_l^2(x_1, \ldots, x_n) + \sum_{i=1}^{n} \alpha_{li} x_i,$$

l=1, ..., n, and, $\bar{f}_l^2(x_1, \ldots, x_n)$ is consists of only the degree 2 part and the constant part of $\bar{f}_l(x_1, \ldots, x_n)$; and $$\Phi^{-1} \cdot \hat{F} \cdot \Phi =$$

$$\bar{F}(X) = \sum_{\substack{0 \le i \le j \\ q^i + q^j \le D}} A_{ij} X^{q^i + q^j} + \sum_{q^j \le D} B_j X^{q^j} W_j(Z(X)) + G(Z(X)) + C$$

where the coefficients are randomly chosen, $\Phi \circ Z \circ \Phi^{-1}(x_1, \ldots, x_n) = (z_1, \ldots, z_r, 0, \ldots, 0)$. The new MPKC is a new cryptographic communication process for encryption and decryption.

The public key includes 1) the structure of field (k), 2) the set of n public polynomials $(f_1^e(x_1, \ldots, x_n), \ldots, f_n^e(x_1, \ldots, x_n))$. To encrypt a message, $X=(x_1, \ldots, x_n)$, any one can download the set of new public polynomial and calculate $(f_1^e(x_1, \ldots, x_n), \ldots, f_n^e(x_1, \ldots, x_n)) = (y_1, \ldots, y_n)$. The new secret key includes $$z_i = \sum_{j=1}^{n} e_{ij} x_j + b_i,$$

i=1, ..., r, $\tilde{F}$, $L_1$, $L_2$ and the structure of K.

To decrypt a message $Y=(y_1, \ldots, y_n)$, the legitimate user performs the following steps. 1) The legitimate user applies $L_2^{-1}$ to (Y) to produce an intermediate value $Y'=(y'_1, \ldots, y'_n)$, 2) Then chooses all possible values for $z_i$, i=1, ..., r one by one (all total $q^r$) and calculating $\bar{F}_{(z_1, \ldots, z_r)}^{-1}(y'_1 - g_1(z_1, \ldots, z_r), \ldots, y'_m - g_m(z_1, \ldots, z_r)) = (x''_1, \ldots, x''_n) = X''$, $$\bar{F}_{(z_1, \ldots, z_r)}(x_1, \ldots, x_n) = (\bar{f}_1^2(x_1, \ldots, x_n) + \sum_{i=1}^{n} a_{1i} q_{1i}(z_1, \ldots, z_r) x_i, \ldots,$$

where $$\bar{f}_m^2(x_1, \ldots, x_n) + \sum_{i=1}^{n} a_{mi} q_{mi}(z_1, \ldots, z_r) x_i),$$

where we use the inverse function $\tilde{\tilde{F}}$ for any fixed values of $z_1, \ldots, z_r$ through again the Berlekamp's algorithm, which can be calculated easily when (D) is not too large. 3) The last step is to calculate $L_1^{-1}(x''_1, \ldots, x''_n)$, which produces a value for $(x_1, \ldots, x_n)$. Note that in Step 2), one might get multiple solutions, this can be handled easily as in the case of HFE, namely by either applying the PLUS method, or using other technique such as hash functions.

2.3 We can combine the IPP and EIP together to be applied to HFE, which can produce an internally perturbed HFE-Plus cryptosystem, IPHFE+.

3. Multi-Layer Oil-Vinegar Construction (MOVC) Method 3.1 The Basic Idea of MOVC The third method, which is called a multi-layer Oil-Vinegar construction (MOVC), will be described with an example of applying this method, which produce the so-called Rainbow signature system will be presented. We will first present the basic idea and then the example, which is can also be found in the inventor's work in [DS4].

The method of multi-layer Oil-Vinegar construction (MOVC), which can be used to attach or "glue" together different types or the same type of constructions of multivariate public key cryptosystem via Oil-Vinegar construction to build new multivariate public key cryptosystems—asymmetric cryptographic communication processes.

Again assume that we have a multivariate public key cryptosystem, a cryptographic communication process.

This public key cryptosystem's public key consists of the field (or ring) structure of a finite field (or ring) (k) and a set of (m) polynomials over (k) $(f_1(x_1, \ldots, x_n), \ldots, f_m(x_1, \ldots, x_n))$ of a low degree (d) with (n) variables, which are publicly accessible to anyone. The public transformation or computation, which is used either as an process to encrypt a message or a process to verify the authenticity of either the signatures or the authentication code for a document, is to calculate $(f_1(x_1, \ldots, x_n), \ldots, f_m(x_1, \ldots, x_n)) = (y_1, \ldots, y_m) = Y$ for a given value (X) represented by a vector of (n) elements of a finite field, or ring (k), $X=(x_1, \ldots, x_n)$, and only for signatures or authentications, one also needs to check if this Y is indeed the same as the attached signature or authentication code, which is another vector (Y') of (m) elements of the finite field or ring (k). If indeed, these two vector coincides, the authenticity of the signature or the authentication code is accepted, otherwise denied.

The secret transformation or computation, which is a process one can find the (or a) value of (n) vectors $X=(x_1, \ldots, x_n)$ for any given value of a vector of (m) elements of the finite field or ring (k), $Y=(y_1, \ldots, y_m)$ such that $(f_1(x_1, \ldots, x_n), \ldots, f_m(x_1, \ldots, x_n)) = (y_1, \ldots, y_m)$, requires the knowledge of the secret key, or the cryptographic secret that $(f_1(x_1, \ldots, x_n), \ldots, f_m(x_1, \ldots, x_n))$ can be factorized as a composition of three transformations:

$(f_1(x_1, \ldots, x_n), \ldots, f_m(x_1, \ldots, x_n)) = L_2 \circ \bar{F} \circ L_1(x_1, \ldots, x_n)$, where ∘ means the composition of the transformations, $L_1$, $L_2$, are invertible affine linear transformations over the space of vectors of (n) and (m) elements of (k) respectively, and $\bar{F}(x_1, \ldots, x_n) = (\bar{f}_1(x_1, \ldots, x_n), \ldots, \bar{f}_m(x_1, \ldots, x_n))$ is another polynomial transformation, which has a fast algorithm to calculate its inverse $\bar{F}^{-1}$ efficiently, or equivalently for any $Y=(y_1, \ldots, y_m)$, there is a fast algorithm to calculate efficiently the (or a) value of $X=(x_1, \ldots, x_n)$ which satisfies $\bar{F}(x_1, \ldots, x_n) = (y_1, \ldots, y_m)$. The secret key is only accessible to the legitimate user. The secret computation process is used either to decrypt a message or to produce a legitimate signature or authentication code that can be publicly verified.

A multivariate public key cryptosystem as a cryptographic communication process as described above, is said be derived from an Oil-Vinegar construction if it is the same process as described as above, except that the transformation defined by $\bar{F}(x_1, \ldots, x_n) = (\bar{f}_1(x_1, \ldots, x_n), \ldots, \bar{f}_m(x_1, \ldots, x_n))$ is give in the way that the set of variables $x_1, \ldots, x_n$ are divided into two groups, say the set $x_1, \ldots, x_v$ is the first group, which are called Oil variables, and $x_{v+1}, \ldots, x_n$ is the second group, which are called Vinegar variables, such that we can find the inverse transformation of $\bar{F}$, or equivalently to solve (or find a solution or all solutions for) the equation $\bar{F}(x_1, \ldots, x_n) = (y_1, \ldots, y_m)$, with a fast algorithm efficiently, if we are given the value of the Vinegar variables or we can guess the value of the Vinegar variables.

The method of MOVC builds new MPKC. One instance of the new multivariate public key cryptosystems, a new asymmetric cryptographic communication process is described as following. The new set of public polynomials become $(\bar{f}_1^=(x_1, \ldots, x_N), \ldots, \bar{f}_M^=(x_1, \ldots, x_N))$, which has a new cryptographic secret that $(\bar{f}_1^=(x_1, \ldots, x_N), \ldots, \bar{f}_M^=(x_1, \ldots, x_N)) = \bar{L}_2 \circ \hat{F} \circ \bar{L}_1(x_1, \ldots, x_N)$, where $\bar{L}_1, \bar{L}_2$ are randomly chosen invertible affine linear transformations over the space of (N) and (M) elements of (k) respectively, $\hat{F}(x_1, \ldots, x_N)$ is derived from $\bar{F}(x_{v_i}, \ldots, x_N)$, $i=1, \ldots, 1$; $1 = v_1 < v_2 \ldots < v_l < N$ by attaching them together: $\hat{F}(x_1, \ldots, x_N) = (\bar{F}_1(x_{v_1}, \ldots, x_N), \ldots, \bar{F}_l(x_{v_l}, \ldots, x_N))$, and each $\bar{F}_i(x_{v_i}, \ldots, x_N)$, $i = 1, \ldots, 1, 1-1$ comes from a Oil-Vinegar construction, which we call it the i-th layer of Oil-Vinegar construction)), it transforms a vector of $(N-v_i+1)$ elements of (k) to a vector of $(u_i)$ elements of (k) with $x_{v_i}, \ldots, x_{v_{i+1}-1}$ as the oil variable and $x_{v_{i+1}}, \ldots, x_N$ the Vinegar variables, and $\bar{F}_1(x_{v_1}, \ldots, x_N)$ does not have to (but can be) an Oil-Vinegar construction and it transforms a vector of $(N-v_1+1)$ elements of (k) to a vector of $(u_1)$ elements of (k); $M = u_1 + u_2 + \ldots + u_l$.

The new cryptographic communication process consists of two parts.

1) A public transformation, a process to transform a value $(\bar{X})$ represented by a vector of (N) elements of a finite field, or ring (k), $X = (x_1, \ldots, x_N)$, into another value $(\bar{Y})$ represented by a vector of (M) elements of the finite field or ring (k), by the new set of (M) multivariate polynomials over (k) $(\bar{f}_1^=(x_1, \ldots, x_N), \ldots, \bar{f}_M^=(x_1, \ldots, x_N))$;

2) A secret transformation, a process to obtain the value (or a value) $(\bar{X})$ from the value $(\bar{Y})$ by means of inverting the transformation defined by $(\bar{f}_1^=(x_1, \ldots, x_N), \ldots, \bar{f}_M^=(x_1, \ldots, x_N))$ with the knowledge of the cryptographic secret: $(\bar{f}_1^=(x_1, \ldots, x_N), \ldots, \bar{f}_M^=(x_1, \ldots, x_N)) = \bar{L}_2 \circ \hat{F} \circ \bar{L}_1(x_1, \ldots, x_N)$, which is performed by the following steps. Apply first $\bar{L}_2^{-1}$ to (Y) to produce an intermediate value $Y' = (y'_1, \ldots, y'_M)$. Apply $\bar{F}_l^{-1}$ to $(y'_{M-u_l+1}, \ldots, y'_M)$ to derive the values of $x_{v_l}, \ldots, x_N$ which we denote as $(x''_{v_l}, \ldots, x''_N)$. Replace the Vinegar variables $x_{v_l}, \ldots, x_N$ by $(x''_{v_l}, \ldots, x''_N)$ in the equation:

$\bar{F}_{l-1}(x_{v_{l-1}}, \ldots, x_N) = (y'_{M-u_l-u_{l-1}}, \ldots, y'_{M-u_l})$ of the (l-1)-th layer of the Oil-Vinegar construction and solve it to derive a solution for the Oil variables $x_{v_{l-1}}, \ldots, x_{v_l-1}$.

Apply the same procedure to the (l-2)-th layer of the Oil-Vinegar construction to derive the solution for the Oil variables $x_{v_{l-2}}, \ldots, x_{v_{l-1}-1}$ using the values of the Oil variables of this layer derived from the step above. Repeat the procedure to the next layer, again the one next, and all the way to the last layer corresponding to $\bar{F}_1$, to derive the values for all $x_1, \ldots, x_N$, which we denote as $x''_1, \ldots, x''_N$. Calculate $\bar{L}_1^{-1}(x''_1, \ldots, x''_N)$, which produces a values for $\bar{X} = (x_1, \ldots, x_N)$.

The public transformation is used either to encrypt a message or verify if a signature or an authentication code for a document is indeed valid. The secret transformation is used to either decrypt a message or produce a signature or an authentication code for a document.

3.2 The application MOVC to the Oil-vinegar signature scheme.

The MOVC method will be demonstrated through an example, where we apply MOVC to the Oil-vinegar signature scheme to build a new family of signature scheme, Rainbow. [DS4]

3.2.1 The Oil-Vinegar construction.

The Oil-Vinegar construction method was developed by Patarin etc [P2][KPG]. They used it to build balance and unbalanced Oil-Vinegar Signature schemes. The balanced case was first developed by Patarin[P2] but it is broken by Kipnis and Shamir[KS1]. The unbalanced family was developed by Patarin, Kipnis and Goubin, which is an improvement of the balanced case[KPG].

Again, assume that we have a finite field (k), and we will work in this section over this field (k) through the rest of Section 3.2.

Let o and v be two positive integers. Let $x_1, \ldots, x_o$ be a set of variables, which we call Oil variables, and $x'_1, \ldots, x'_v$ be a set of variables which we call Vinegar variables. For this pair of sets of Oil and Vinegar variables, a polynomial $f(x_1, \ldots, x_o, x'_1, \ldots, x'_v)$ is called an Oil-Vinegar polynomial, if it is in the form $$f(x_1, \ldots, x_o, x'_1, \ldots, x'_v) = \sum_{i=1, j=1}^{o,v} a_{ij} x_i x'_j + \sum_{i \le j=1}^{v} b_{ij} x'_i x'_j + \sum_{i=1}^{n} c_i x_i + \sum_{j=1}^{v} d_j x'_j + e$$

Let $\bar{F}$ be a transformation from $k^{o+v}$ to $k^o$ such that $\bar{F}(x_1, \ldots, x_o, x'_1, \ldots, x'_v) = (\bar{f}_1(x_1, \ldots, x_o, x'_1, \ldots, x'_v), \ldots, \bar{f}_o(x_1, \ldots, x_o, x'_1, \ldots, x'_v))$, and each $\bar{f}_i(x_1, \ldots, x_o, x'_1, \ldots, x'_v)$, $i = 1, \ldots, o$, is a randomly or specially chosen Oil-Vinegar polynomial with $x_1, \ldots, x_o$ be the set of Oil variables, $x'_1, \ldots, x'_v$ be the set of Vinegar variables.

For each value in $Y = (y_1, \ldots, y_o)$ in $k^o$, one can find a pre-images of Y under the transformation $\bar{F}$ easily, or equivalently, we can find solutions for the equation $\bar{F}(x_1, \ldots, x_o, x'_1, \ldots, x'_v) = (\bar{f}_1(x_1, \ldots, x_o, x'_1, \ldots, x'_v), \ldots, \bar{f}_o(x_1, \ldots, x_o, x'_1, \ldots, x'_v)) = Y$, or equivalently we can calculate the inverse of $\bar{F}$ easily. This is done, by first guessing the values of all Vinegar variables, which makes the equations above into a set of o linear equations with all the Oil variables. This set of equations can be solved easily if it has a solution, and if it does not we can repeat the process a few times until we get a solution, which is for sure to occur after a few tries. [P2] [KPG1].

For an Oil-Vinegar signature schemes, the set of public polynomials is given by $F(x_1, \ldots, x_{o+v}) = \bar{F} \circ L_1(x_1, \ldots, x_{o+v})$, where $L_1$ is an randomly (or specially) chosen invertible affine transformation. One notes that if we choose $\bar{F}$ in a special way, we may need to add in the front an invertible affine factor $L_2$. If we choose $\bar{F}$ randomly, then we do not need $L_2$.

An Oil-Vinegar signature schemes is set up as follows. Let assume Bob intends to set up an Oil-Vinegar signature schemes for himself. He first choose o, v, $\bar{F}$ and $L_1$ as described above, and derive $F(x_1, \ldots, x_{o+v}) = \bar{F} \circ L_1(x_1, \ldots, x_{o+v})$. For this MPKC for Bob, the public key consists of 1) the field structure of (k), 2) the set of polynomials of $F(x_1, \ldots, x_{o+v})$. Bob would publicize the public key, for example, he could put it on his publicly accessible web-page. Let $Y = (y_1, \ldots, y_o)$, which either the document itself, or the hash value of a document, which can be viewed as certain concentration of the document. Here one requires this hash process to be secure and publicly accessible as well. To give the document Y, Bob uses the private key, which consists of $\bar{F}$ and $L_1$. Then he will find a value of $X''=(x''_1, \ldots, x''_{o+v})$ such that $F(x''_1, \ldots, x''_{o+v})=Y$ using the secret computation process as follows. Bob applies first $\bar{F}^{-1}$ as described above to Y to derive a value, which we will denote as $(x'_1, \ldots, x'_{o+v})$. Then he will apply $L_1^{-1}$ to $(x'_1, \ldots, x'_{o+v})$, which is to calculate $L_1^{-1}(x'_1, \ldots, x'_{o+v})$. We denote the result by $(x''_1, \ldots, x''_{o+v})$ and it is the signature Bob wants. Then Bob attaches the signature $(x''_1, \ldots, x''_{o+v})$ either to his document Y or the document, which has a hash value Y, where he also specifies which hash he uses. For Alice, a person, who sees or receives this pair, namely the document and the signature, she will then use the public computation process to verify the authenticity of the document by following steps. She downloads F and the hash if needed. Then she computes $F(x''_1, \ldots, x''_{o+v})$ to check if indeed it is the same as Y, which she either has, or can compute using the same hash as Bob does. If they are the same, then it is indeed a document signed by Bob, otherwise rejects it as a forgery. The balanced case is the case where o=v and it was defeated by Kipnis and Shamir[KS1], which therefore is of no practical value, The unbalanced case is the case $v \geq o$, and to be secure, it requires that $q^{v-o}$ is substantial large. This means the signature (o+v) is at least twice the size of the document (o). Therefore this system is very inefficient.

3.2.2 The Rainbow, multi-layer Oil-Vinegar signature schemes.

Let S be the set $\{1, 2, 3, \ldots, n\}$. Let $v_1, \ldots, v_u$ be u integers such that $0 < v_1 < v_2 < \ldots < v_u = n$, and define the sets of integers $S_i = \{1, 2, \ldots, v_i\}$ for $i=1, \ldots, u$, so that we have $S_1 \subset S_2 \subset \ldots \subset S_u = S$. The number of elements in $S_i$ is $v_i$. Let $O_i = v_{i+1} - v_i$, for $i=1, \ldots, u-1$. Let $O_i$ be the set such that $O_i = S_{i+1} - S_i$, for $i=1, \ldots, u-1$. Let $P_l$ be the linear space of quadratic polynomials spanned by polynomials of the form $$\sum_{i \in O_l, j \in S_l} \alpha_{ij} x_i x_j + \sum_{i \leq j \in S_l} \beta_{ij} x_i x_j + \sum_{i \in S_{l+1}} \gamma_i x_i + \eta.$$

These are Oil and Vinegar type of polynomials such that $x_i$, $i \in O_l$ are the Oil variables and $x_i$, $i \in S_l$ are the Vinegar variables. We call $x_i$, $i \in O_l$ the 1-th layer Oil variable and $x_i$, $i \in S_l$ the 1-th layer Vinegar variable. We denote $P_l$ the set of all 1-th layer Oil and Vinegar polynomials. Clearly we have $P_i \in P_j$ for $i < j$. In this way, each $P_l$, $l=1, \ldots, u-1$ is a set of Oil and Vinegar polynomials. Each polynomial in $P_l$ has as $x_i$, $i \in O_l$ its Oil variables and $x_i$, $i \in S_l$ as its Vinegar variables. The Oil and Vinegar polynomials in $P_i$ can be defined as polynomials such that $x_i$, $i \in O_i$ are the Oil variables and $x_i$, $i \in S_i$ are the Vinegar variables. This can be illustrated by the fact that $S_{i+1} = S_i \cup O_i$, $S_i \cap O_i = \emptyset$.

Next we define the transformation $\bar{F}$ of the Rainbow signature scheme. It is a transformation $\bar{F}$ from $k^n$ to $k^{n-v_1}$ such that $\bar{F}(x_1, \ldots, x_n) = (\bar{F}_1(x_1, \ldots, x_n), \ldots, \bar{F}_{n-1}(x_1, \ldots, x_n)) = (\bar{f}_1(x_1, \ldots, x_n), \ldots, \bar{f}_{n-v_1}(x_1, \ldots, x_n))$, each of $\bar{F}_i$ consists of $o_i$ randomly chosen quadratic polynomials from $P_i$. $\bar{F}$ actually has u-1 layers of Oil and Vinegar constructions one upon another one. The first layer consists of $o_1$ polynomials $\bar{f}_1, \ldots, \bar{f}_{o_1}$ such that $x_j, j \in O_1$ are the Oil variables and $x_j, j \in S_1$ are the Vinegar variables. The i-th layer consists of $o_i$ polynomials, $\bar{f}_{v_i+1}, \ldots, \bar{f}_{v_{i+1}}$, such that $x_j, j \in O_i$ are the Oil variables and $x_j, j \in S_i$ are the Vinegar variables. From this, we can build a rainbow of our variables:

$[x_1, \ldots, x_{v_1}]; \{x_{v_1+1}, \ldots, x_{v_2}\}$
$[x_1, \ldots, x_{v_1}, x_{v_1+1}, \ldots, x_{v_2}]; \{x_{v_2+1}, \ldots, x_{v_3}\}$
$[x_1, \ldots, x_{v_1}, x_{v_1+1}, \ldots, x_{v_2}, x_{v_2+1}, \ldots, x_{v_3}]; \{x_{v_3+1}, \ldots, x_{v_4}\}$
$\ldots; \ldots$
$[x_1, \ldots, \ldots, \ldots, \ldots, \ldots, \ldots, \ldots, \ldots, \ldots, x_{v_{u-1}}];$
$\{x_{v_{u-1}+1}, \ldots, x_n\}$ Each row above represents a layer of the Rainbow. For the 1-th layer above, the ones in [ ] are Vinegar variables, the ones in { } are Oil variables and each layer's Vinegar variables consists of all the variables in the previous layer. We call $\bar{F}$ a Rainbow polynomial map with u-1 layers. Let $L_1, L_2$ be two randomly chosen invertible affine linear maps, $L_2$ is on $k^{n-v_1}$ and $L_1$ on $k^n$. Let $F(x_1, \ldots, x_n) = L_2 \circ \bar{F} \circ L_1(x_1, \ldots, x_n)$, which consists of n-$v_1$ quadratic polynomials with n variables.

Let's assume that Bob intends to set up an Rainbow signature schemes for himself. He first chooses $\bar{F}$ and $L_1$, $L_2$ as described above, and derives $F(x_1, \ldots, x_n) = L_2 \circ \bar{F} \circ L_1(x_1, \ldots, x_n)$. For this MPKC for Bob, the public key consists of 1) the field structure of (k), 2) the set of polynomials of $F(x_1, \ldots, x_n)$. Bob would publicize the public key, for example, he could put it on his publicly accessible web-page.

Let $Y = (y_1, \ldots, y_{n-v_1})$, which is either the document itself, or the hash value of a document that can be viewed as certain concentration of the document. Here one requires this hash process to be secure and publicly accessible as well. To give the document Y a legitimate signature, Bob uses the private key. The private key consists of the transformation $\bar{F}$ and $L_1$, $L_2$. He will find a value of $X'' = (x''_1, \ldots, x''_n)$ such that $F(x''_1, \ldots, x''_n) = Y$ using the secret computation process as follows. Bob applies first $L_2^{-1}$ as described above to Y to derive a value, which we will denote as $(y'_1, \ldots, y'_{n-v_1})$.

Next Bob needs to apply $\bar{F}^{-1}$. In this case, Bob needs to solve the equation $\bar{F}(x_1, \ldots, x_n) = (y'_1, \ldots, y'_{n-v_1})$. To do so, Bob first randomly chooses the values of $x_1, \ldots, x_{v_1}$ and plugs them into the first layer of $o_1$ equations given by $\bar{F}_1(x_1, \ldots, x_{v_2}) = (y'_1, \ldots, y'_{o_1})$. This produces a set of $o_1$ linear equations with $o_1$ variables, $x_{o_1+1}, \ldots, x_{v_2}$, we solve it to find the values of $x_{o_1+1}, \ldots, x_{v_2}$. This is just a repetition of the procedure described in Section 3.2.1 above for the Oil-Vinegar signature scheme to invert the $\bar{F}$ there.

Then Bob has all the values of $x_i$, $i \in S_2$. Then he plugs these values into the second layer of polynomials, which will again produce $o_2$ number of linear equations, which then gives us the values of all $x_i$, $i \in S_3$. We repeat the procedure until we find a solution.

If at any time, a set of linear equations does not have a solution, he will start from the beginning again by choosing another set of values for $x_1, \ldots, x_{v_1}$. We will continue until we find a solution. With a very high probability Bob can expect to succeed if the number of layers is not too large.

We denote a solution Bob finds by $(x'_1, \ldots, x'_n)$.

Then he will apply $L_1^{-1}(x'_1, \ldots, x'_n)$, which is to calculate $L_1^{-1}(x'_1, \ldots, x'_n)$, which is $(x''_1, \ldots, x''_n)$ that is the signature Bob wants. Then Bob attaches the signature $(x''_1, \ldots, x''_n)$ either to his document Y or the document, which has a hash value Y, where he also specifies which hash he uses.

For Alice, a person, who sees or receives this pair, namely the document and the signature, she will then use the public computation process to verify the authenticity of the document by following steps.

She downloads F and the hash if needed. Then she computes $F(x''_1, \ldots, x''_n)$ to check if indeed it is the same as Y, which she either has, or can compute using the same hash as Bob does. If they are the same, then it is indeed a document signed by Bob, otherwise rejects it as a forgery. In a rainbow scheme, the length of the document is n-$v_1$, the length of the signature is n and we can make $v_1$ much smaller than n.

Therefore Rainbow can be much more efficient than the unbalance Oil-Vinegar signature schemes as shown in [KPG]

4) Combinations of the methods. We can combine any two of the methods together to build new MPKC. For example, we can combine IPP with MOVC, such that there are only two layers, the fist layer is just a PMI+, and its variables are used as Vinegar variables for the next Oil-Vinegar construction. Similarly we can combine EIP with MOVC.

We can also combine all three together.

5) One way to build variants of our methods is to just choose special kind of polynomials in our methods, such as sparse polynomials, where most of terms are zeroes. The MPKC in [YC1] and [WHLCY] belongs to such examples of Rainbows.

LITERATURE CITED

1. [ACDG] Mehdi-Laurent Akkar, Nicolas T. Courtois, Romain Duteuil, Louis Goubin A Fast and Secure Implementation of Sflash, Volume 2567, pp 267-278 Lecture Notes in Computer Science
2. [CM] Chen, J., Moh, T. On the Goubin-Courtois Attack on TTM, Cryptology ePrint Archive (2001/72).
3. [CYP] Chen, J., Yang, B., Peng, B. Tame Transformation Signatures with Topsy-Yurvy Hashes IWAP'02
4. [C] Nicolas T. Courtois, The Security of Hidden Field Equations (HFE), Progress in cryptology, CT-RSA, LNCS, Vol. 2020, (C. Naccache ed.), Springer, 2001, Pages 266-281
5. [CG] Goubin, L., Courtois, N., Cryptanalysis of the TTM cryptosystem, Asiacrypt2000, LNCS 1976, 44-57.
6. [CGP] Nicolas Courtois, Louis Goubin, Jacques Patarin FLASH, a Fast Multivariate Signature Algorithm Volume 2020, pp 0298 Lecture Notes in Computer Science.
7. [CGP1] Jacques Patarin, Louis Goubin, Nicolas Courtois, C-+* and HM: Variations around Two Schemes of T. Matsumoto and H. Imai, ASIACRYPT'98, LNCS, Vol. 1514, (K. Ohta and D. Pei ed.) Springer, 1998, Page 35-50.
8. [CGP2] Jacques Patarin, Nicolas Courtois, Louis Goubin QUARTZ, 128-Bit Long Digital Signatures, Volume 2020, pp 0282 Lecture Notes in Computer Science.
9. [DF] Fell, Harriet; Diffie, Whitfield, Analysis of a public key approach based on polynomial substitution. Advances in cryptology—CRYPTO '85 (Santa Barbara, Calif., 1985), 340--349, Lecture Notes in Comput. Sci., 218, Springer, Berlin, 1986.
10. [D] Ding, Jintai, A New Variant of the Matsumoto-Imai Cryptosystem through Perturbation}, PKC'04, Lecture Notes in Computer Science 2947, Springer-Verlag Heidelberg
11. [DG] Jintai Ding, Jason Gower. Inoculating Multivariate Schemes Against Differential Attacks. IACR eprint: 2005/255. http://eprint.iacr.org.
12. [DS1] Jintai Ding and Dieter Schmidt, A Defect of the Implementation Schemes of the TTM Cryptosystem, Technical Track, ACNS'03, http://eprint.iacr.org
13. [DS2] Jintai Ding and Dieter Schmidt, The new TTM schemes are not secure Coding, Cryptography and Combinatorics 2003 (K. Q. Feng, H. Niederreiter and C. P. Xing, eds.), Birkhauser, Basel.
14. [DS3] Jintai Ding and Dieter Schmidt, Cryptanalysis of HFEv and the Internal Perturbation of HFE cryptosystems}, In Serge Vaudenay, editors Public Key Cryptosystems, PKC-2005, Lecture Notes in Computer Sciences, volume 3386, pages 288-301 Springer, 2005.
15. [DS4] Jintai Ding, Dieter Schmidt. Rainbow, a new multivariable public key signature scheme, the Third International Conference of Applied Cryptography and Network Security (ACNS 2005), New York, Jun. 7-10, 2005, Lecture Notes in Computer Science 3531, Page 164-175, Springer, 2005
16. [DY], Jintai Ding, Zhijun Yin. Cryptanalysis of TTS and Tame-Like Multivariable Signature Schemes, presented and published in the Third International Workshop in Applied Public-key Infrastructure, pages 14-25, 2004 (IWAP'04)
17. [FJ] Jean-Charles Faugère and Antoine Joux, Algebraic cryptanalysis of hidden field equation (HFE) cryptosystems using Gröbner bases, In Dan Boneh, editor, *Advances in cryptology—CRYPTO* 2003, LNCS, volume 2729, pages 44-60. Springer 2003.
18. [FGS] Pierre-Alain Fouque and Louis Granboulan and Jacques Stern, Differential Cryptanalysis for Multivariate Schemes, Advances in Cryptology—EUROCRYPT 2005, LNCS 3494, 2005, Springer-Verlag GmbH, 341-353.
19. [KPG] Aviad Kipnis, Jacques Patarin, Louis Goubin, Unbalanced Oil and Vinegar Signature Schemes, *Eurocrypt '99*, *LNCS*, volume 1592, pages 206-222. Springer, 1999.
20. [KS] Aviad Kipnis, Adi Shamir, Cryptanalysis of the HFE Public Key Cryptosystem by Relinearization, In M. Wiener, editor, *Advances in cryptology—Crypto '99*, LNCS, volume 1666, pages 19-30. Springer, 1999.
21. [KS1] Aviad Kipnis, Adi Shamir, Cryptanalysis of the Oil \& Vinegar Signature Scheme, Crypto '98, Lecture Notes in Computer Science, V. 1462, Springer-Verlag Heidelberg.
22. [MI] Matsumoto, T., Imai, H, Public quadratic polynomial-tuples for efficient signature verification and message encryption, Advances in cryptology—EURO\-CRYPT '88 (Davos, 1988), 419-453, Lecture Notes in Comput. Sci., 330, Springer, Berlin, 1988.
23. [M] Moh, T. T., A fast public Key System with Signature and Master key functions, Lecture Notes at EE department of Stanford University. (May 1999), http://www.usdsi.com/ttm.html.
24. [MCY] T Moh, J. M. Chen and Boyin Yang, Building Instances of TTM Immune to the Goubin-Courtois Attack and the Ding-Schmidt Attack, IACR eprint: 2004/168. http://eprint.iacr.org.
25. [P] Patarin, J., Cryptanalysis of the Matsumoto and Imai public key scheme of Eurocrypt '88, Advances in Cryptology—Crypto '95, LNCS, Vol. 963, (D. Coppersmith, ed.) Springer-Verlag, 1995, Page 248-261.
26. [P1] Patarin, J., Hidden field equations and isomorphism of polynomials, Eurocrypto '96, 1996. 33-48, LNCS, Spinger.
27. [P2] Patarin, J., The oil and Vinegar signature scheme, The Dagstuhl Workshop on Cryptography, September 1997.
28. [Sh] Shamir, Adi, Efficient signature schemes based on birational permutations, Advances in cryptology—CRYPTO '93 (Santa Barbara, Calif., 1998), 257--266, Lecture Notes in Comput. Sci., 1462, Springer, Berlin, 1993.
29. [Sp] Shor, Peter, Polynomial-time algorithms for prime factorization and discrete logarithms on a quantum computer, SIAM Rev. 41 (1999), no. 2, 303--332
30. [WHLCY] Lih-Chung Wang, Yuh-Hua Hu, Feipei Lai, Chun-yen Chou, Bo-Yin Yang, Tractable Rational Map Signature, Public Key Cryptography 2005. LNCS V. 3386, 244-257, Springer 31. [WYHL] Lih-Chung Wang and Bo-Yin Yang, Yu-hua HU, Peipei Lai, A "Medium-Field" Multivariate Public-Key Encryption Scheme, Accepted for the RSA-CT 2006 and to appear in LNCS.
32. [YC] B. Yang, J. Chen, A More Secure and Efficacious TTS Signature Scheme, ICISC'03 and http://eprint.iacr.org.
33. [YC1] Bo-Yin Yang, Jiun-Ming Chen, Building Secure Tame-like Multivariate Public-Key Cryptosystems: The New TTS. ACISP 2005, LNCS V. 3574, 518-531, Springer.
34. [YCC] Bo-Yin Yang, Jiun-Ming Chen, Yen-Hung Chen, TTS: High-Speed Signatures on a Low-Cost Smart Card, CHES 2004, LNCS. V. 3156, 371-385, Springer

What is claimed is:

1. A cryptographic method for application to a multivariate public key cryptosystem (MPKC) to produce new multivariate public key cryptosystems or asymmetric cryptographic communication processes, wherein said multivariate public key cryptosystem is a cryptographic communication process comprising:
   a) a public transformation which transforms a value (X) represented by a vector of $k^n$, a set or space of (n) elements of a finite field, or ring (k), $X=(x_1,\ldots,x_n)$, into another value (Y) represented by a vector of $k^m$, a set or space of (m) elements of the finite field or ring (k), $Y=(y_1,\ldots,Y_m)$, through a set of (m) multivariate polynomials, $(f_1(x_1,\ldots,x_n),\ldots,f_m(x_1,\ldots,x_n))$ over (k) which are publicly available, have a low degree (d) and the transformation is computed as $(f_1(x_1,\ldots,x_n),\ldots,f_m(x_1,\ldots,x_n))=(y_1,\ldots,y_m)$; wherein the transformation is used by anyone for encrypting a message or verifying the authenticity of a digital signature or a digital authentication code for a document; and
   b) a secret transformation for obtaining the value (X) from the value (Y) by means of inverting the transformation defined by $(f_1(x_1,\ldots,x_n),\ldots,f_m(x_1,\ldots,x_n))$, with the knowledge of a cryptographic secret, wherein the secret transformation is used by a legitimate user, who has the knowledge of the cryptographic secret, to decrypt a message, or produce a digital signature for a document or an authentication code for a document; and
   c) wherein producing a family of new multivariate public key cryptosystems or new asymmetric cryptographic communication process over any prior existing MPKC, which refers to any existing or future MPKC that does not use the method in its design, comprising the steps:
   i) adding directly into the prior MPKC internal perturbation through a small number (r) of randomly or specially chosen new internal variables $$z_i = \sum_{j=1}^{n} a_{ij}x_j + b_i,$$

$i=1,\ldots,r$ whose linear part without the constant term $b_i$, a fixed value in k and not a variable, are linearly independent as linear functions of variables $x_i$ in the public transformation; and
   ii) appending ($\alpha$) more components, which are randomly or specially chosen polynomials to the already perturbed MPKC, and composing randomly or specially chosen invertible affine or linear transformations, such that a newly produced MPKC improved by the method, has a new public transformation for transforming the value (X) represented by (n) elements of a finite field, or ring (k), $X=(x_1,\ldots,x_n)$ into another value $(Y^+)$ represented by (m+$\alpha$) elements of the finite field or ring (k), $Y^+=(y_1,\ldots y_{m+\alpha})$, through this newly produced set of (m+$\alpha$) multivariate polynomials $(f^+_1(x_1,\ldots,x_n),\ldots,f^+_{m+\alpha}(x_1,\ldots,x_n))$ over (k); and
   iii) a secret transformation for obtaining the value (X) from the value $(Y^+)$ by means of inverting the transformation defined by $(f^+_1(x_1,\ldots,x_n),\ldots,f^+_{m+\alpha}(x_1,\ldots,x_n))$, with the knowledge of the prior cryptographic secret and the secrets in the adding step and appending step.

2. A cryptographic method for application to a multivariate public key cryptosystem (MPKC) to produce new multivariate public key cryptosystems or asymmetric cryptographic communication processes, wherein said multivariate public key cryptosystem is a cryptographic communication process comprising:
   a) a public transformation which transforms a value (X) represented by a vector of $k^n$, a set or space of (n) elements of a finite field, or ring (k), $X=(x_1,\ldots,x_n)$, into another value (Y) represented by a vector of $k^m$, a set or space of (m) elements of the finite field or ring (k), $Y=(y_1,\ldots,y_m)$, through a set of m multivariate polynomials, $(f_1(x_1,\ldots,x_n),\ldots,f_m(x_1,\ldots,x_n))$ over (k) which are publicly available, have a low degree (d) and the transformation is computed as $(f_1(x_1,\ldots,x_n),\ldots,f_m(x_1,\ldots,x_n))=(y_1,\ldots,y_m)$; wherein the transformation is used by anyone for encrypting a message or verifying the authenticity of a digital signature or a digital authentication code for a document; and
   b) a secret transformation for obtaining the value (X) from the value (Y) by means of inverting the transformation defined by $(f_1(x_1,\ldots,x_n),\ldots,f_m(x_1,\ldots,x_n))$, with the knowledge of a cryptographic secret, wherein the secret transformation is used by a legitimate user, who has the knowledge of the cryptographic secret, to decrypt a message, or produce a digital signature for a document or an authentication code for a document; and
   c) wherein producing a family of new multivariate public key cryptosystems or new asymmetric cryptographic communication process over any prior existing MPKC, which refers to any existing or future MPKC that does not use the method in its design, comprising the steps:
   i) adding randomly or specially chosen polynomials of randomly or specially chosen new internal variables $$z_i = \sum_{j=1}^{n} a_{ij}x_j + b_i,$$

$i=1,\ldots,r$ whose linear part without the constant term $b_i$, a fixed value not a variable, are linearly independent, and adding specially chosen polynomial terms, which are multiplication of the internal variables $z_1,\ldots,z_r$, with polynomials term from the prior MPKC; and
   ii) composing randomly or specially chosen invertible affine or linear transformations, such that a new MPKC, such that the new MPKC has a new public transformations for transforming a value (X) represented by (n) elements of a finite field, or ring (k), $X=(x_1,\ldots,x_n)$, into another value (Y) represented by (m) elements of the finite field or ring (k), $Y=(y_1,\ldots,y_m)$, through the new set of (m) multivariate polynomials $(f^e_1(x_1,\ldots,x_n),\ldots,f^e_m(x_1,\ldots,x_n))$ over (k); and
   iii) a secret transformation for obtaining the value (X) from the value $(Y^+)$ by means of inverting the transformation defined by $(f^e_1(x_1, \ldots, x_n), \ldots, f^e_m(x_1, \ldots, x_n)$, with the knowledge of the prior cryptographic secret and the secrets in the adding step and appending step.

3. A cryptographic method for application to Oil-Vinegar multivariate public key cryptosystems (MPKC), by attaching together several layers of Oil-Vinegar construction, to produce new multivariate public key cryptosystems or asymmetric cryptographic communication processes, wherein said Oil-Vinegar multivariate public key cryptosystems is a cryptographic communication process comprising:

a) a public transformation which transforms value (X) represented by a vector of $k^n$, the set or space of (n) elements of a finite field, or ring (k), $X(x_1, \ldots, x_n)$, into another value (Y) represented by a vector of $k^m$, a set or space of (m) elements of the finite field or ring (k), $Y=(y_1, \ldots, y_m)$, through the set of m multivariate polynomials, $(f_1(x_1, \ldots, x_n), \ldots, f_m(x_1, \ldots, x_n))$ over (k) which are publicly available, have a low degree (d) and the transformation is computed as $(f_1(x_1, \ldots, x_n), \ldots, f_m(x_1, \ldots, x_n))=(y_1, \ldots, y_m)$; wherein the public transformation is used by anyone for encrypting a message or verifying the authenticity of a digital signature or a digital authentication code for a document; and b) a secret transformation for obtaining the value (X) from the value (Y) by means of inverting the transformation defined by $(f_1(x_1, \ldots, x_n), \ldots, f_m(x_1, \ldots, x_n))$, with the knowledge of a cryptographic secret, wherein the secret transformation is used by a legitimate user, who has the knowledge of the cryptographic secret, to decrypt a message, or produce a digital signature for a document, or a authentication code for a document; and c) factorizing $(f_1(x_1, \ldots, x_n), \ldots, f_m(x_1, \ldots, x_n))$ as a composition of three transformations:
$(f_1(x_1, \ldots, x_n), \ldots, f_m(x_1, \ldots, x_n))=L_2 \circ \bar{F} \circ L_1(x_1, \ldots, x_n)$,
where $\circ$ means the composition of the transformations, $L_1, L_2$ are invertible affine linear transformations over the space of vectors of $k^n$ and $k^m$ respectively, such that $\bar{F}(x_1, \ldots, x_n)=(\bar{f}_1(x_1, \ldots, x_n), \ldots, \bar{f}_m(x_1, \ldots, x_n))$ is give in the way that the set of variables $x_1, \ldots, x_n$ are divided into two groups, and the set $x_1, \ldots, x_v$ is the first group, which is called Oil variables, and $x_{v+1}, \ldots, x_n$, is the second group, which are called Vinegar variables, to find the inverse transformation of $\bar{F}$, or equivalently to solve (or find a solution or all solutions for) the equation $\bar{F}(x_1, \ldots, x_n)=(y_1, \ldots, y_m)$, with a fast algorithm efficiently by guessing or searching the value of the Vinegar-variables; and d) wherein a family of new multivariate public key cryptosystems or new asymmetric cryptographic communication process over any prior existing Oil-vinegar MPKC is produced by
i) dividing the variables into different layers of Oil Vinegar variables, such that in each of the layers, it uses the Oil-Vinegar construction and the whole set of previous layer of variables (both oil and vinegar if they are divided as such becomes the vinegar variables of this layer; and
ii) composing randomly or specially chosen invertible affine or linear transformations, such that the new MPKC has a secret transformation, which requires the knowledge of the secrets in the dividing step and mixing step.

4. The method according to claim 1, wherein the degree of the final public polynomials is 2 or bigger.

5. The method according to claim 2, wherein the degree of the final public polynomials is 2 or bigger.

6. The method according to claim 3, wherein the degree of the final public polynomials is 2 or bigger.

7. The method of claim 1, wherein any randomly or specially chosen polynomial or linear function is given as either choosing all the coefficient randomly, or choose majority of the coefficients to be zero, but certain special coefficients randomly.

8. The method of claim 2, wherein any randomly or specially chosen polynomial or linear function is given as either choosing all the coefficient randomly, or choose majority of the coefficients to be zero, but certain special coefficients randomly.

9. The method of claim 3, wherein any randomly or specially chosen polynomial or linear function is given as either choosing all the coefficient randomly, or choose majority of the coefficients to be zero, but certain special coefficients randomly.

* * * * *